(12) United States Patent
Hsieh et al.

(10) Patent No.: US 8,009,341 B2
(45) Date of Patent: Aug. 30, 2011

(54) HOLOGRAPHIC INFORMATION RECORDING AND REPRODUCING APPARATUS FOR THE SAME

(75) Inventors: Mei Li Hsieh, Taipei (TW); Shiuan Huei Lin, Taipei (TW); Jui Hsin Wang, Taipei (TW); Ken Yuh Hsu, Taipei (TW); Don Yau Chiang, Taipei (TW)

(73) Assignees: CMC Magnetics Corporation, Taipei (TW); National Chiao Tung University, Hsin Chu (TW)

( * ) Notice: Subject to any disclaimer, the term of this patent is extended or adjusted under 35 U.S.C. 154(b) by 328 days.

(21) Appl. No.: 12/289,481

(22) Filed: Oct. 29, 2008

(65) Prior Publication Data

US 2009/0122375 A1      May 14, 2009

(30) Foreign Application Priority Data

Nov. 5, 2007   (TW) ............................. 96141631 A (51) Int. Cl.
*G03H 1/04* (2006.01)
*G03H 1/22* (2006.01)
(52) U.S. Cl. ................. 359/35; 359/10; 359/11; 359/32
(58) Field of Classification Search ............. 359/1, 10, 359/11, 35, 32; 369/103
See application file for complete search history.

(56) References Cited

U.S. PATENT DOCUMENTS

| | | | | |
|---|---|---|---|---|
| 6,330,088 B1* | 12/2001 | Klug et al. | ....... | 359/23 |
| 6,522,433 B2* | 2/2003 | Kelsey et al. | ....... | 359/34 |
| 7,079,469 B2* | 7/2006 | Itoh et al. | ....... | 369/103 |
| 2002/0163680 A1* | 11/2002 | Zabka | ....... | 359/10 |

* cited by examiner

*Primary Examiner* — Audrey Y Chang
(74) *Attorney, Agent, or Firm* — Bacon & Thomas, PLLC (57) ABSTRACT

In a holographic information recording and reproducing apparatus, an optical fiber guides a reference beam toward a recording medium for holographic recording, and a precision rotator is turned, so that the reference beam is incident on the recording medium at different angles and interferes with a data-carrying signal beam to complete the recording of holographic information on the recording medium. To reproduce the holographic information, the optical fiber guides a reading beam, and the reading beam is incident on the recording medium at an angle the same as the reference beam for the recording to reproduce the holographic information stored on the recording medium. With the optical fiber and the precision rotator, a simplified light path system and a wide range of incident angles for the reference and reading beams may be achieved, and the transmissive, reflective, and 90-degree holographic storage techniques may be integrated in one single apparatus.

10 Claims, 8 Drawing Sheets

HOLOGRAPHIC INFORMATION RECORDING AND REPRODUCING APPARATUS FOR THE SAME

FIELD OF THE INVENTION

The present invention relates to a holographic information recording/reproducing apparatus, and more particularly to a holographic information recording/reproducing apparatus in which an optical fiber and a precision rotator are used to enable angular multiplexing storage of information on a holographic recording medium.

BACKGROUND OF THE INVENTION

The holographic information storage refers to a technique that utilizes holographic interference recording to store data on a recording medium. To record, interference of two light waves with one another is required. One of the two light waves is a data-carrying light beam referred to as a signal beam. The signal beam is incident on the recording medium in a fixed direction. Another one of the two light waves is a light beam referred to as a reference beam. Different physical conditions, including incident angle, phase, etc., under which the reference beam is incident on the recording medium are changeable. When the reference beam and the signal beam are incident on the recording medium and interfere with one another, the refractivity of the recording medium changes with the interference of the two beams with one another, so that the recording medium forms a phase grating to enable recording of information thereon. To reproduce the recorded information from the recording medium, a reading beam is incident on the recording medium under the same conditions used by the reference beam in recording the information on the recording medium, and a diffraction signal of the reading beam is the original signal beam to form an image on a light detector, such as a charge-coupled device (CCD). Then, the information is reproduced.

In the process of holographic recording, when the reference beam and the signal beam are incident on the recording medium from the same side of the recording medium, the holographic recording is referred to as a transmissive holographic storage; when the two beams are incident on the recording medium from two generally opposite sides of the recording medium, the holographic recording is referred to as a reflective holographic storage; and when the reference beam and the signal beam are incident on the recording medium from two adjacent sides of the recording medium with an angle about 90 degrees contained between the two beams, the holographic recording is referred to as a 90-degree holographic storage.

Figure 11:
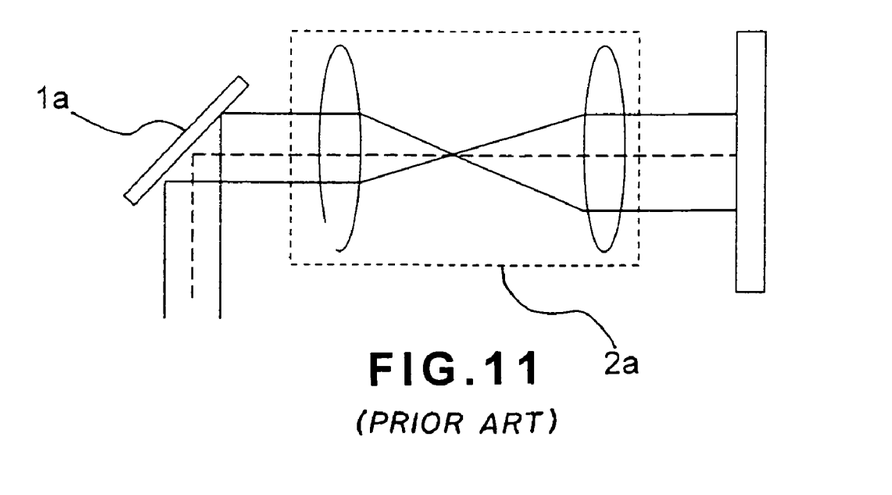
FIG. 11 is a conceptual view showing the scan mirror and the lens assembly used in the prior art for holographic recording and reproducing.
Figure 12:
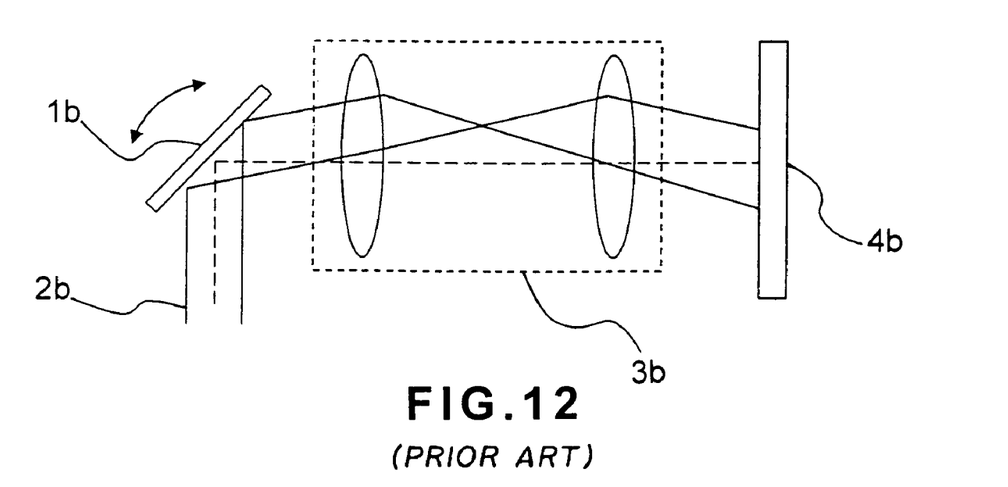
FIG. 12 is a conceptual view showing the angular multiplexing holographic recording and reproducing in the prior art.

In addition, the technique of recording holographic information through changing different conditions of the reference beam is referred to as multiplexing storage, such as wavelength multiplexing storage, angular multiplexing storage, peristrephic multiplexing storage, etc. With the multiplexing storage, a large quantity of data may be stacked and recorded on the same one position of the recording medium to allow a very high storage capacity in the holographic information storage. Among these multiplexing storage techniques, the angular multiplexing storage is one of the most frequently used techniques. With the angular multiplexing storage, each page of data will be recorded using the reference beam at a different incident angle, and the data is stored on the recording medium at the same one position. In other words, the reference beam must be changeable in its incident angle and must always be incident on the same position on the recording medium. As shown in FIG. 11, to fulfill this requirement, an angle-changeable scan mirror 1a is conventionally used along with a lens assembly 2a to configure a light path for the reference beam. Please refer to FIG. 12. In the prior art, an angle-changeable scan mirror 1b is used to change the direction of the reference beam 2b, and a lens assembly 3b is used to change only the incident angle of the reference beam 2b without changing the incident position of the reference beam 2b on a recording medium 4b, so as to achieve the requirement of angular multiplexing storage. However, the conventional angular multiplexing storage is limited by two things: (1) the aperture size of the optical elements in the lens assembly form a limit to the angle range within which the incident angle of the reference beam may be changed; and (2) the changeability of the optical system in the holographic information recording apparatus forms a limit to the applicability of the holographic information recording apparatus to the above-mentioned three different holographic storage techniques, because it is uneasy to change the optical system once it has been configured.

More particularly, the above-mentioned first limit will lower the system storage capacity. When the limit to the storage capacity by a geometrical configuration is taken into consideration, it can be observed that the storage capacity of the recording medium at the same one position is equal to the total range of changeable incident angles for the reference beam divided by the angular space between recording two adjacent pages. However, the minimum angular space is decided according to the Bragg condition. Therefore, the maximum storage capacity at the same one position on the recording medium is limited by the changeable total recording angle allowed for the reference beam, and the total recording angle is limited by the aperture size of the lenses in the above-mentioned lens assembly in the light path of the reference beam. Therefore, when the above-mentioned prior art is applied in the holographic information storage, the changeable angle allowed for the reference beam will limit the size of the storage capacity. For example, a storage material Model Number HDS2000 supplied by InPhase Technologies is used to estimate the limit to the storage capacity by the aperture size of the optical elements. The value "M/#" corresponds to the sum of the square root of the diffraction efficiency (D.E.) of each recorded page (M/#=$\Sigma\sqrt{D.E.}$). M/# may be used to assess the total response value of the recording medium. The higher the total response value is, the higher information quantity may be stored on the recording medium. The storage material Model Number HDS2000 has an M/# value of 10 and a thickness of 1 mm. From the Bragg condition, it is estimated the minimum angular space is 0.1 degree, and numerical aperture of the lenses used in the light path for the reference beam is 0.5. And, to obtain better reference beam quality, only the light beam passed through the central area of the lenses is used, and the total recording angle thereof is about 20 degrees. With these conditions, when viewing from the point of geometrical configuration, the holographic storage capacity will be limited to within 200 pages when the angular multiplexing storage technique is used to record. However, when viewing from the point of recording medium quality, given that the diffraction efficiency of data on each page that can be detected by the light detector is $1\times10^{-4}$, then the storage capacity is 1000 pages. This storage capacity value has exceeded the limit by the geometrical configuration. Therefore, in the event it is desired to fully utilize the storage capacity of the recording medium, the aperture size of the lenses in the light path for the reference beam must be increased. By doing this, it will inevitably increase the volume and weight of the optical elements in the light path for the reference beam and thereby results in a very large and impractical holographic storage system.

The above-mentioned second limit will lower the system flexibility. Since different recording media are different in their characteristics and separately suitable for use with different types of storage configurations, it is necessary to setup different holographic systems for different storage configurations to record holographic information on the different recording media. In the conventional holographic storage systems, there are included a plurality of optical elements. To change the system configuration, the light path must be re-calibrated, and it is uneasy to do so. Particularly, for the angular multiplexing, it involves in very complicated procedures to adjust the optical system of the reference beam. Thus, the conventional optical system consisting of the scan mirror and the lens assembly is not common for the transmissive, the reflective, and the 90-degree holographic storage configuration.

In view of the above two limiting factors in the conventional angular multiplexing storage, it is tried by the inventor to develop an improved holographic information recording and reproducing apparatus to overcome such limits, so that the reference beam is arranged in a new way to allow a versatile information access system and largely increase the storage capacity that is otherwise limited by the geometrical configuration.

SUMMARY OF THE INVENTION

A primary object of the present invention is to provide a holographic information recording and reproducing apparatus with a simplified optical path system for a reference beam while achieving the function of angular multiplexing storage.

Another object of the present invention is to provide a versatile holographic information recording and reproducing apparatus, with which all the three different types of holographic storage techniques, namely, the transmissive, the reflective, and the 90-degree holographic storage, can be performed to achieve higher storage capacity on a holographic recording medium.

To achieve the above and other objects, the holographic information recording and reproducing apparatus according to the present invention uses fixed optical elements to guide a signal beam toward a recording medium, and an optical fiber to guide a reference beam and a reading beam toward the recording medium. The optical fiber has an input end via which the reference beam and the reading beam are coupled to the optical fiber, and an output end fixedly connected to an outer edge of a precision rotator. The recording medium is located at a hollow center of the precision rotator without contacting with the precision rotator. At the output end of the optical fiber, the reference beam forms a divergent light wave that is incident on the recording medium located at the center of the precision rotator. When it is desired to perform the transmissive holographic storage with the apparatus of the present invention, the 360-degree rotatable precision rotator may be turned to move the output end of the optical fiber, so that the reference beam is incident on the recording medium in a direction the same as the signal beam and interferes with the signal beam to complete the recording of holographic information on the recording medium. Or, when it is desired to perform the reflective holographic storage with the apparatus of the present invention, the signal beam is maintained at the same incident direction while the reference beam guided by the precision rotor is incident on the recording medium in a direction generally opposite to the signal beam. Similarly, when it is desired to perform the 90-degree holographic storage with the apparatus of the present invention, the reference beam guided by the precision rotor is incident on the recording medium in a direction perpendicular to the signal beam, so that a 90-degree angle is contained between the reference beam and the signal beam.

The holographic information recording/reproducing apparatus of the present invention provides at least the following two advantages:

(1) The apparatus may be readily and quickly changed to a different holographic storage configuration simply by turning the precision rotator to change the position of the output end of the optical fiber relative to the recording medium, so that the reference beam may be incident on the recording medium at a different incident angle without the need of conducting another optical alignment.

(2) The apparatus allows the angular multiplexing within a wide angle range. Since the light path for the reference beam is not limited by the size of optical elements, the reference beam may accurately scan within an expanded range of angles to complete data access. Meanwhile, with the expanded range of incident angles, the storage capacity of the recording medium may be largely increased.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
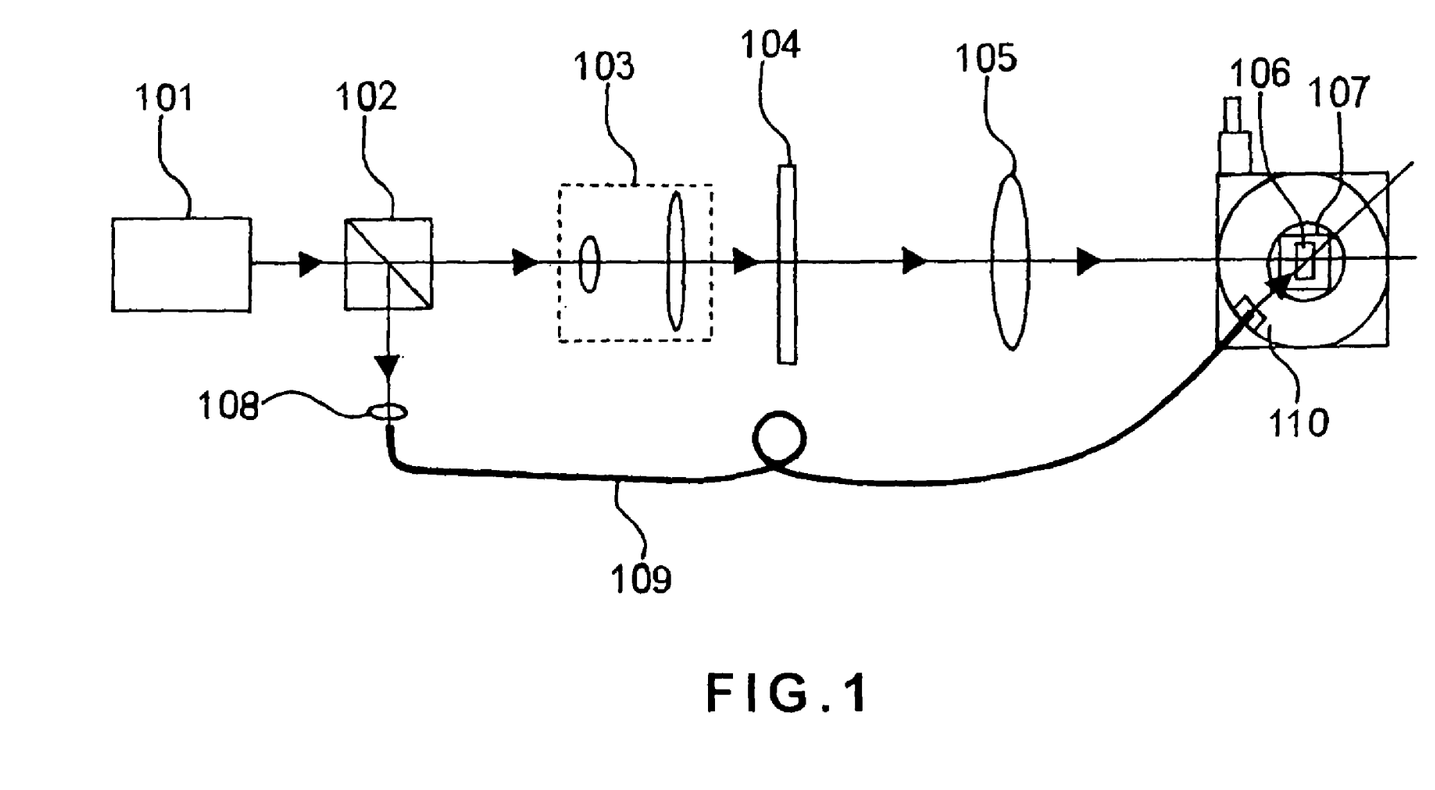
FIG. 1 is a conceptual view showing a holographic information recording apparatus according to an embodiment of the present invention.

Please refer to FIG. 1 that is a conceptual view showing a holographic information recording apparatus according to an embodiment of the present invention. As shown, in a system of the holographic information recording apparatus of FIG. 1, there are many optical elements, including a laser light source 101, a beam splitter 102, a beam expander 103, a spatial light modulator 104, a first focusing lens 105, a stationary carrier 107, a second focusing lens 108, an optical fiber 109, and a precision rotator 110.

The laser light source 101 is a coherent light beam. The beam splitter 102 divides the laser light source 101 into two light beams, one of which is a signal beam while the other is a reference beam. The signal beam passes through the beam expander 103 to have an expanded beam diameter, and then passes through the spatial light modulator 104 to have a cross-sectional light intensity varying with spatial positions. The first focusing lens 105 condenses the signal beam and transmits the condensed signal beam to a recording medium 106 positioned on the stationary carrier 107, which is located at a center of the precision rotator 110 to work independently without being affected by the precision rotator 110. On the other hand, the reference beam reflected from the beam splitter 102 is coupled to the optical fiber 109 via the second focusing lens 108, and is output from an output end of the optical fiber 109 fixedly connected to the precision rotator 110. The reference beam will form divergent light wave that is output from the optical fiber 109 and incident on the recording medium 106.

As shown in FIG. 1, at the first recording, the reference beam is incident on the recording medium 106 at a specific angle to interfere with the signal beam carrying the first page of data, and the recording of holographic information on the recording medium 106 is completed. At the second recording, the precision rotator 110 is turned by a predetermined angle to deviate from the position for the first recording, so that the reference beam is incident on the recording medium 106 at another angle different from that at the first recording. Meanwhile, the signal beam passes through the spatial light modulator 104 to input the second page of data, and interferes with the reference beam to complete the second recording. By repeating the above operations, the recording of holographic information on the recording medium may be sequentially completed through the angular multiplexing holographic recording technique, and multiple groups of interference signals are stored on the recording medium 106.

Figure 2:
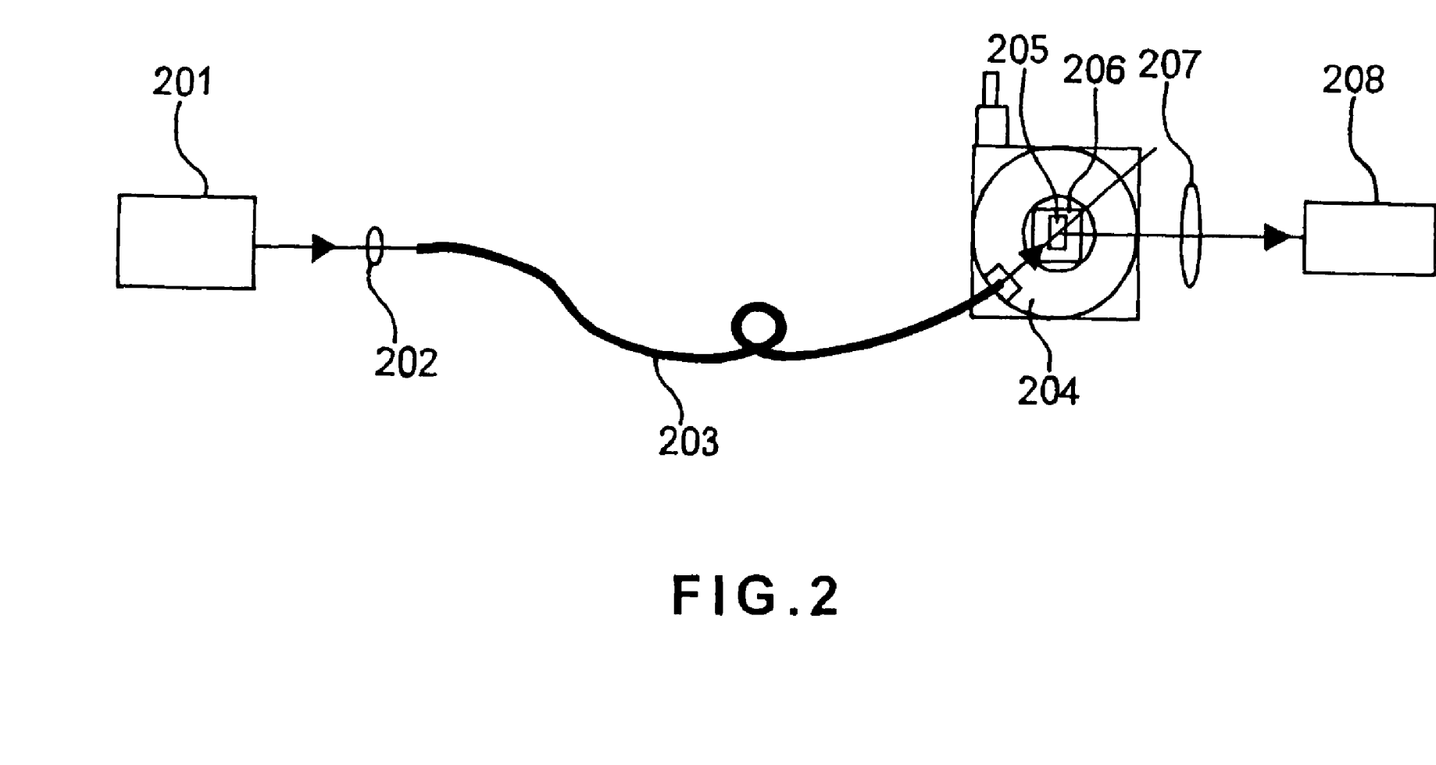
FIG. 2 is a conceptual view showing a holographic information reproducing apparatus according to an embodiment of the present invention.

FIG. 2 is a conceptual view showing a holographic information reproducing apparatus according to an embodiment of the present invention. As shown, in a system of the holographic information reproducing apparatus of FIG. 2, there are many optical elements, including a laser light source 201, a first focusing lens 202, an optical fiber 203, a precision rotator 204, a stationary carrier 206, a second focusing lens 207, and a light detector 208.

The laser light source 201 is a coherent light beam, which is coupled to the optical fiber 203 via the first focusing lens 202 to output from an output end of the optical fiber 203 fixedly connected to the precision rotator 204. Therefore, a reading beam will output divergent light wave from the optical fiber 203, and the divergent light wave is incident on a recording medium 205 positioned on the stationary carrier 206. The recording medium 205 already has multiple groups of interference signals stored thereon before the information reproducing. The stationary carrier 206 is located at a center of the precision rotator 204 to operate independently without being affected by the precision rotator 204.

As can be seen from FIG. 2, to reproduce the holographic information stored in the recording medium 205, a reading beam is incident on the recording medium 205 at an angle controlled by the precision rotator 204. When the incident angle of the reading beam is the same as that of the reference beam at the first recording, then the diffraction signal thereof is the signal beam at the first recording. The diffraction signal is then transmitted via the second focusing lens 207 to the light detector 208 and received by the latter. When the incident angle of the reading beam is the same as that of the reference beam at the second recording, then the diffraction signal thereof is the signal beam at the second recording. The diffraction signal is then transmitted via the second focusing lens 207 to the light detector 208 and received by the latter. By repeating the above operations, the reproducing of holographic information from the recording medium is sequentially completed through the angular multiplexing holographic reproducing technique.

Figure 3:
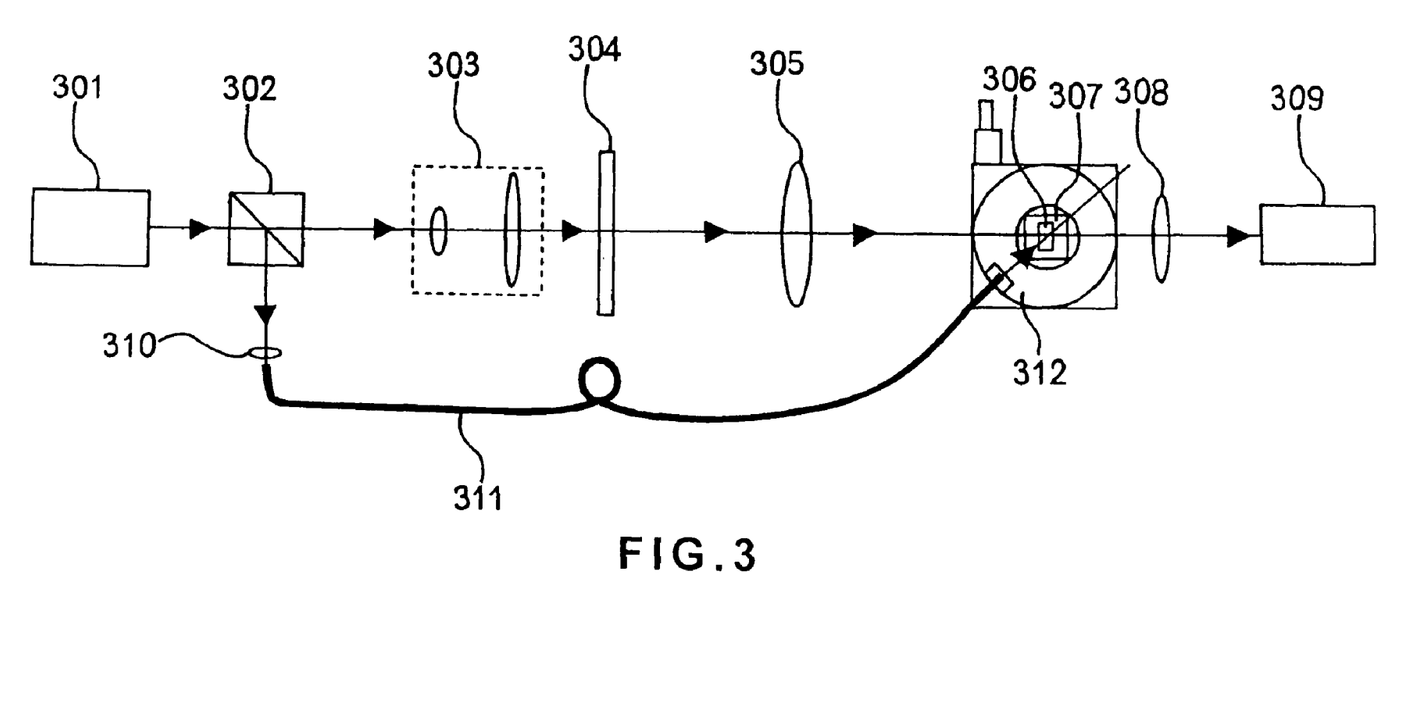
FIG. 3 is a conceptual view showing a holographic information recording and reproducing apparatus according to an embodiment of the present invention.

FIG. 3 is a conceptual view showing a holographic information recording and reproducing apparatus according to an embodiment of the present invention. As shown, in a system of the holographic information recording and reproducing apparatus of FIG. 3, there are many optical elements, including a laser light source 301, a beam splitter 302, a beam expander 303, a spatial light modulator 304, a first focusing lens 305, a stationary carrier 307, a second focusing lens 308, a light detector 309, a third focusing lens 310, an optical fiber 311, and a precision rotator 312.

The laser light source 301 is a coherent light beam. The beam splitter 302 divides the laser light source 301 into two light beams, one of which is a signal beam while the other is a reference beam. The signal beam passes through the beam expander 303 to have an expanded beam diameter, and then passes through the spatial light modulator 304 to have a cross-sectional light intensity varying with spatial positions. The first focusing lens 305 condenses the signal beam and transmits the condensed signal beam to a recording medium 306 positioned on the stationary carrier 307, which is located at a center of the precision rotator 312 to work independently without being affected by the precision rotator 312. The signal beam passed through the recording medium 306 is focused by the second focusing lens 308 to form an image on the light detector 309. On the other hand, the reference beam reflected from the beam splitter 302 is coupled to the optical fiber 311 via the third focusing lens 310, and is output from an output end of the optical fiber 311 fixedly connected to the precision rotator 312. The reference beam will form divergent light wave that is output from the optical fiber 311 and incident on the recording medium 306.

As shown in FIG. 3, at the first recording, the reference beam is incident on the recording medium 306 at a specific angle to interfere with the signal beam carrying the first page of data, and the recording of holographic information on the recording medium 306 is completed. At the second recording, the precision rotator 312 is turned by a predetermined angle to deviate from the position for the first recording, so that the reference beam is incident on the recording medium 306 at another angle different from that at the first recording. Meanwhile, the signal beam passes through the spatial light modulator 304 to input the second page of data, and interferes with the reference beam to complete the recording. By repeating the above operations, the recording of holographic information on the recording medium may be sequentially completed through the angular multiplexing holographic recording technique, and multiple groups of interference signals are stored on the recording medium 306. To reproduce the holographic information stored on the recording medium 306, a reading beam is incident on the recording medium 306 at incident angles controlled by the precision rotator 312. When the incident angle of the reading beam is the same as that of the reference beam at the first recording, then the diffraction signal thereof is the signal beam at the first recording. The diffraction signal is then received by the light detector 309. When the incident angle of the reading beam is the same as that of the reference beam at the second recording, then the diffraction signal thereof is the signal beam at the second recording. The diffraction signal is then received by the light detector 208. By repeating the above operations, the reproducing of holographic information from the recording medium is sequentially completed through the angular multiplexing holographic reproducing technique.

Figure 4:
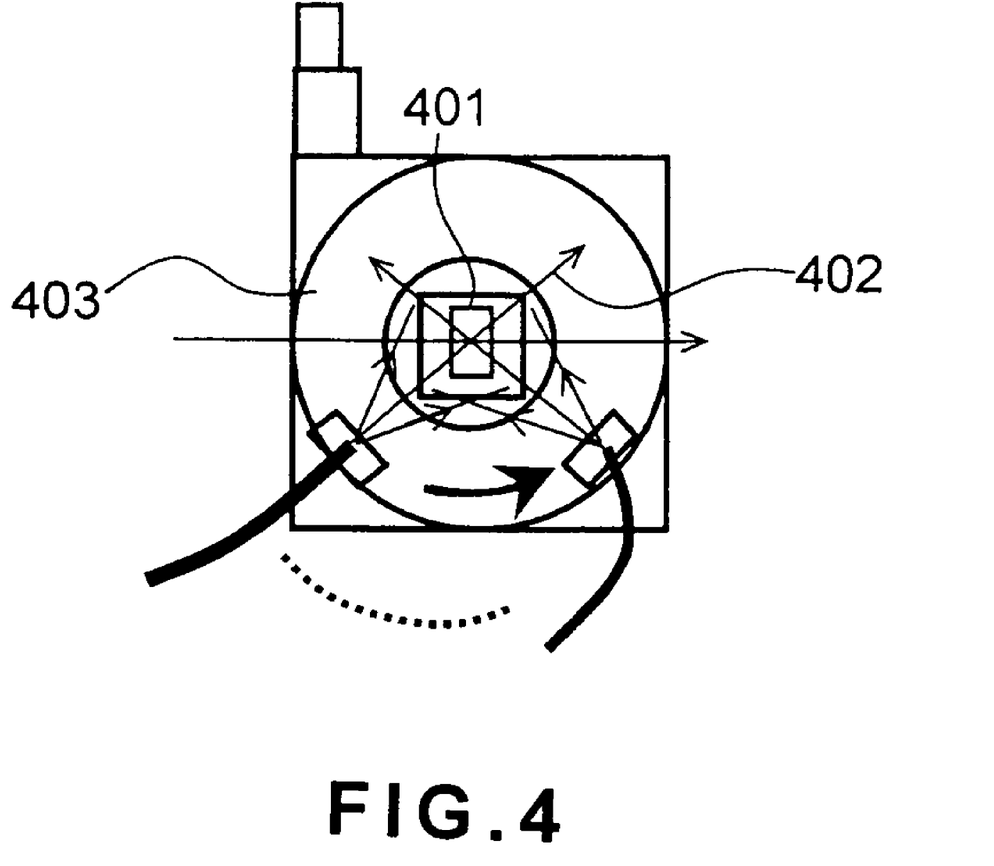
FIG. 4 is a conceptual view showing the positions of the reference beam and the precision rotator used in the apparatus of the present invention.

FIG. 4 shows the positions of the reference beam and a precision rotator 403 used in the apparatus of the present invention. An incident direction 402 of the reference beam or the reading beam relative to a recording medium 401 may be controlled via the precision rotator 403. Therefore, an incident angle of the reference beam or the reading beam is not affected by the optical elements in the system of the holographic information recording/reproducing apparatus of the present invention, and it is possible to maintain the apparatus as an integrated system.

Figure 5:
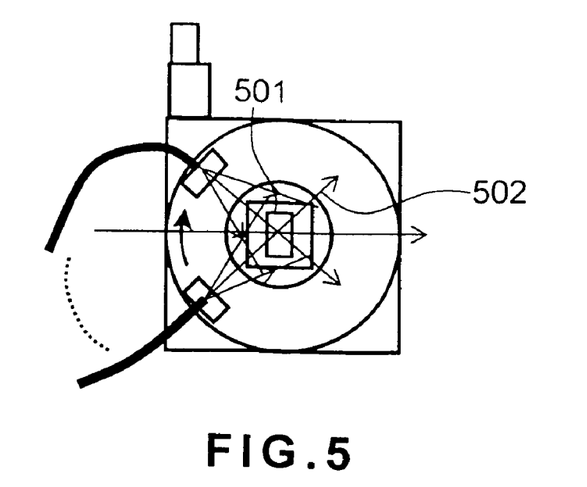
FIG. 5 is a conceptual view showing the transmissive holographic storage with angular multiplexing implemented using the present invention.

FIG. 5 shows the transmissive holographic storage with angular multiplexing implemented using the present invention. In performing holographic information recording, when the reference beam and the signal beam are incident on a recording medium from the same side of the recording medium, the holographic information recording technique is referred to as the transmissive holographic storage technique. According to the transmissive holographic storage technique, given that the signal beam forward incident on the recording medium 501 has an incident angle defined as 0°, then, the reference beam at the recording is incident on the recording medium 501 in an incident direction 502 within the range between +90° and −90°.

Figure 6:
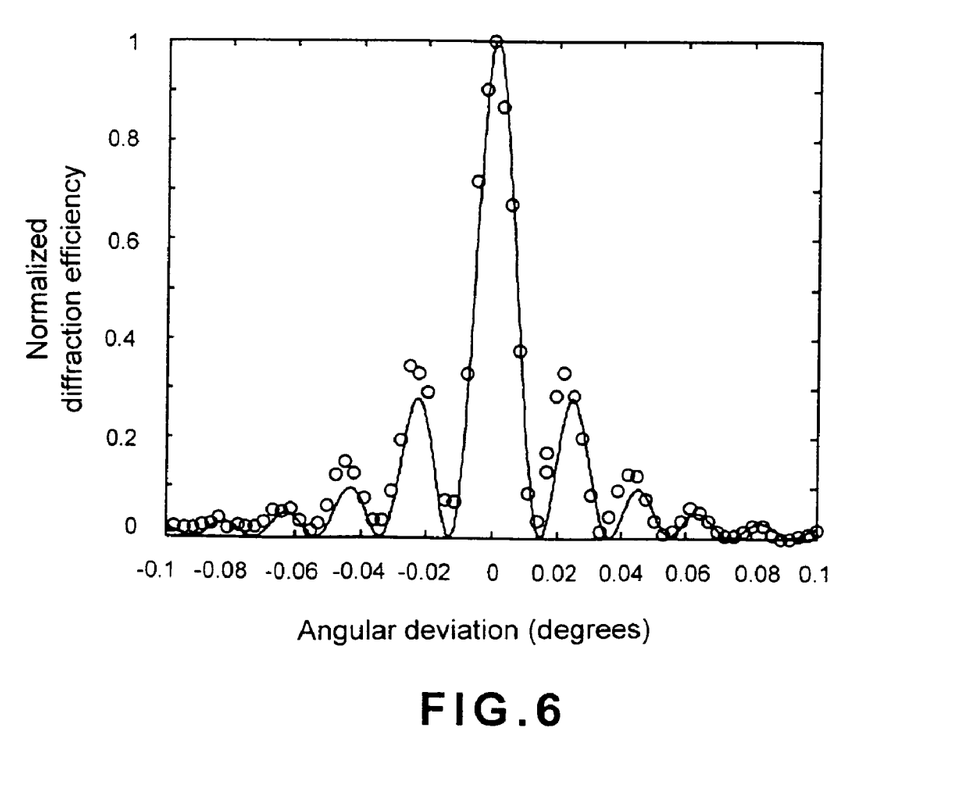
FIG. 6 is a graph analyzing the results from the selectivity experiment on and the simulation of the transmissive holographic storage with angular multiplexing performed with the apparatus of the present invention.

FIG. 6 is a graph analyzing the results from the selectivity experiment on and the simulation of the transmissive holographic storage with angular multiplexing performed with the apparatus of the present invention. Please refer to FIGS. 5 and 6 at the same time. In the selectivity experiment, the recording medium 501 used is a LiNbO₃ crystal, which is a photorefractive crystal having a thickness of 5 mm. At recording, an angle contained between the incident directions of the reference beam and the signal beam is 45°. At reproducing, the reading beam is caused to scan with an angle about 45° contained between the reading beam and the signal beam. It is found the diffraction efficiency attenuates with the increasing angular deviation of the reading beam from the reference beam for recording. In FIG. 6, the dot curve indicates the values obtained in the experiment, and the solid curve indicates the values obtained in the theoretical simulation. Therefore, the angular selectivity in this configuration is 0.01°, which is close to the theoretical value of Bragg selectivity.

Figure 7:
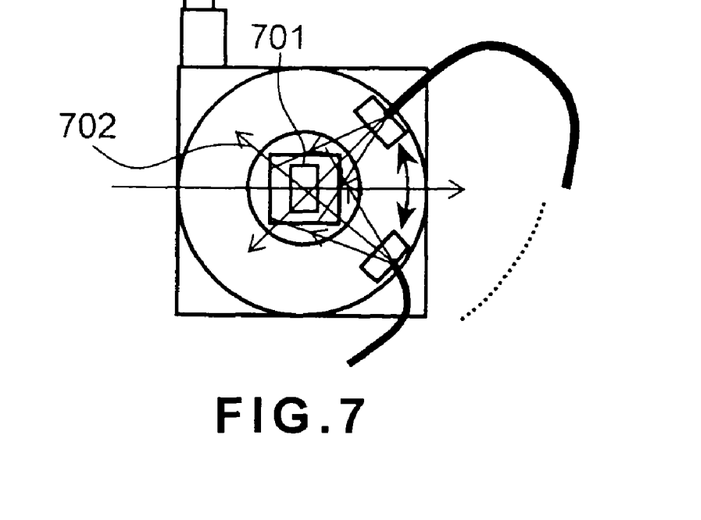
FIG. 7 is a conceptual view showing the reflective holographic storage with angular multiplexing implemented using the present invention.

FIG. 7 shows the reflective holographic storage with angular multiplexing implemented using the present invention. In performing holographic information recording, when the reference beam and the signal beam are incident on a recording medium from two generally opposite sides of the recording medium, the holographic information recording technique is referred to as the reflective holographic storage technique. According to the reflective holographic storage technique, given that the signal beam forward incident on the recording medium 901 has an incident angle defined as 0°, then, the reference beam at the recording is incident on the recording medium 901 in an incident direction 902 within an angle range larger than +90° and smaller than +270°.

Figure 8:
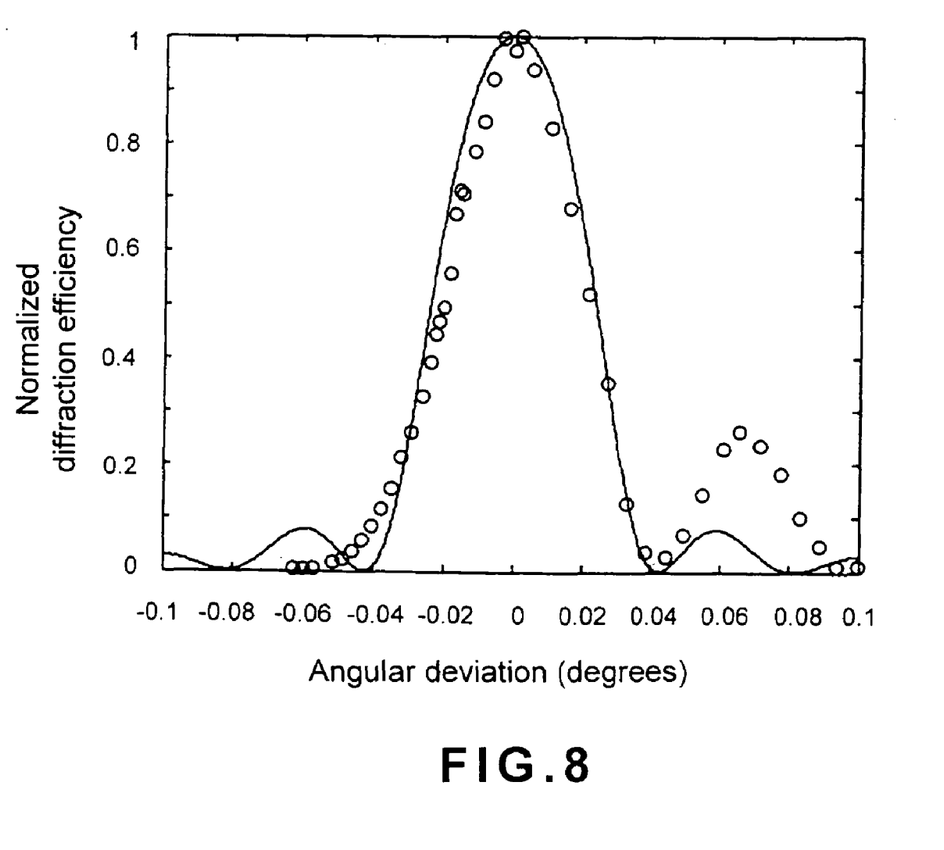
FIG. 8 is a graph analyzing the results from the selectivity experiment on and the simulation of the reflective holographic storage with angular multiplexing performed with the apparatus of the present invention.

FIG. 8 is a graph analyzing the results from the selectivity experiment on and the simulation of the reflective holographic storage with angular multiplexing performed with the apparatus of the present invention. Please refer to FIGS. 7 and 8 at the same time. In the selectivity experiment, the recording medium 901 used is a PQ:PMMA (PhenanthreneQuinone doped Poly (Methyl MethAcrylate)) photopolymer having a thickness of 5 mm. At recording, an angle contained between the reference beam and the signal beam is 135°. At reproducing, the reading beam is caused to scan with an angle about 135° contained between the incident directions of the reading beam and the signal beam. It is found the diffraction efficiency attenuates with the increasing angular deviation of the reading beam from the reference beam for recording. In FIG. 8, the dot curve indicates the values obtained in the experiment, and the solid curve indicates the values obtained in the theoretical simulation. Therefore, the angular selectivity in this configuration is 0.04°

Figure 9:
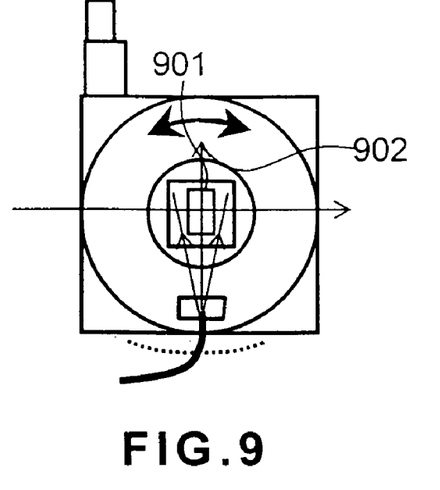
FIG. 9 is a conceptual view showing the 90-degree holographic storage with angular multiplexing implemented using the present invention.

FIG. 9 shows the 90-degree holographic storage with angular multiplexing implemented using the present invention. In performing holographic information recording, when the reference beam and the signal beam are incident on a recording medium with an angle of 90° contained between them, the holographic information recording technique is referred to as the 90-degree holographic storage technique. According to the 90-degree holographic storage technique, given that the signal beam forward incident on the recording medium 901 has an incident angle defined as 0°, then, the reference beam at the recording is incident on the recording medium 901 in an incident direction 702 generally equal to +90° or −90°.

Figure 10:
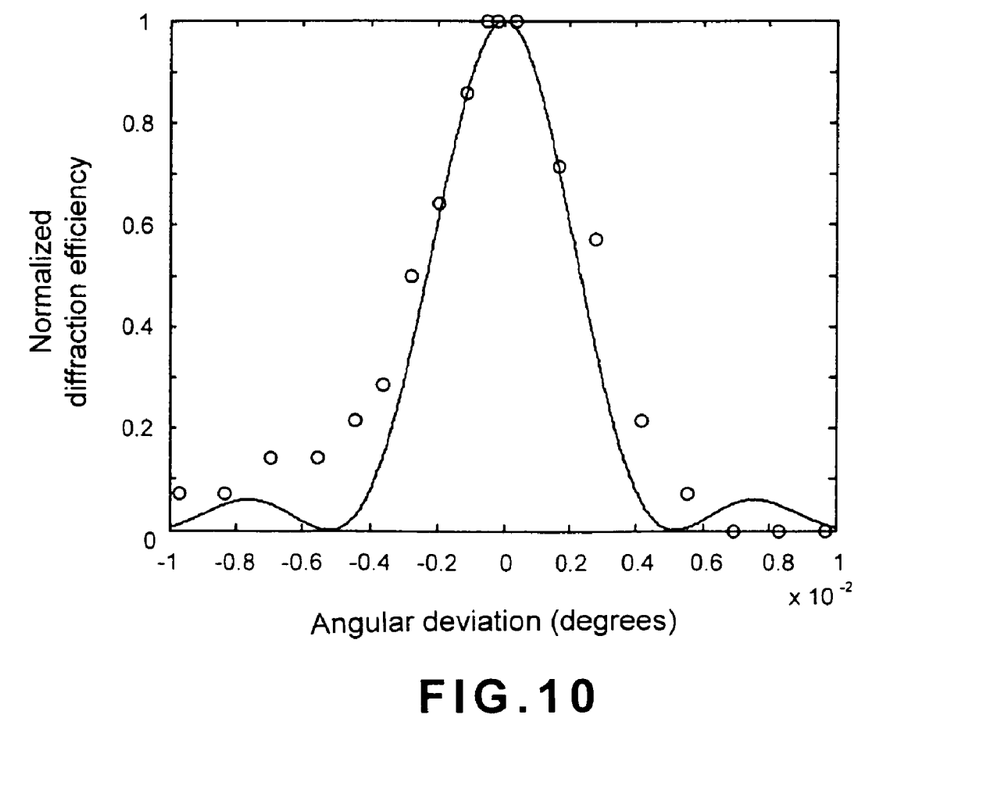
FIG. 10 is a graph analyzing the results from the selectivity experiment on and the simulation of the 90-degree holographic storage with angular multiplexing performed with the apparatus of the present invention.

FIG. 10 is a graph analyzing the results from the selectivity experiment on and the simulation of the 90-degree holographic storage with angular multiplexing performed with the apparatus of the present invention. Please refer to FIGS. 9 and 10 at the same time. In the selectivity experiment, the recording medium 901 used is a LiNbO₃ crystal, which is a photorefractive crystal having dimensions of 10×10×10 mm³. At recording, an angle contained between the reference beam and the signal beam is 90°. At reproducing, the reading beam is caused to scan with an angle about 90° contained between the reading beam and the signal beam. It is found the diffraction efficiency attenuates with the increasing mismatch between the reading beam and the reference beam for recording. In FIG. 10, the dot curve indicates the values obtained in the experiment, and the solid curve indicates the values obtained in the theoretical simulation. Therefore, the angular selectivity in this configuration is 0.004°.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A holographic information recording apparatus, comprising a laser source, a spatial light modulator, an optical fiber, a stationary carrier, and a precision rotator; the optical fiber guiding the laser source, which is a coherent light, to form a divergent light beam at an output end of the optical fiber, and the divergent light beam being directly incident on a recording medium to serve as a reference beam; the stationary carrier being located at a center of the precision rotator to work independently without being affected by the precision rotator; and the optical fiber being connected at the output end to an outer edge of the precision rotator; whereby when the precision rotator is turned, a central incident angle of the reference beam incident on the recording medium is changed.

2. The holographic information recording apparatus as claimed in claim 1, wherein the recording medium is positioned on the stationary carrier.

3. The holographic information recording apparatus as claimed in claim 1, wherein a signal beam for holographic recording passes through the spatial light modulator to thereby have a cross-sectional light intensity varying with different spatial positions and form a data storage signal; and the signal beam is incident on the recording medium in a fixed direction relative to the recording medium.

4. A holographic information reproducing apparatus, comprising a laser source, a light detector, an optical fiber, a stationary carrier, and a precision rotator; the optical fiber guiding the laser source, which is a coherent light, to form a divergent beam at an output end of the optical fiber; the divergent beam being directly incident on a recording medium to serve as a reading beam; the stationary carrier being located at a center of the precision rotator to work independently without being affected by the precision rotator; and the output end of the optical fiber being fixedly connected to an outer edge of the precision rotator; whereby when the precision rotator is turned, a central incident angle of the reading beam incident on the recording medium is changed.

5. The holographic information reproducing apparatus as claimed in claim 4, wherein the recording medium is positioned on the stationary carrier.

6. The holographic information reproducing apparatus as claimed in claim 4, wherein a diffraction beam in the holographic reproducing is transmitted to the light detector, the light detector detects a cross-sectional light intensity distribution of the diffraction beam, and the diffraction beam forms a data reading signal, which has a fixed diffraction direction relative to the recording medium.

7. A holographic information recording and reproducing apparatus, comprising a laser source, a spatial light modulator, a light detector, an optical fiber, a stationary carrier, and a precision rotator; the optical fiber guiding the laser source, which is a coherent light, to form a divergent beam at an output end of the optical fiber; the divergent beam being directly incident on a recording medium to serve as a reference beam for holographic recording or a reading beam for holographic reproducing; the stationary carrier being located at a center of the precision rotator to work independently without being affected by the precision rotator; and the output end of the optical fiber being fixedly connected to an outer edge of the precision rotor; whereby when the precision rotor is turned, a central incident angle of the reference beam or the reading beam incident on the recording medium is changed.

8. The holographic information recording and reproducing apparatus as claimed in claim 7, wherein the recording medium is positioned on the stationary carrier.

9. The holographic information recording and reproducing apparatus as claimed in claim 7, wherein a signal beam for holographic recording passes through the spatial light modulator to thereby have a cross-sectional light intensity varying with different spatial positions and form a data storage signal, which is incident on the recording medium in a fixed direction relative to the recording medium.

10. The holographic information recording and reproducing apparatus as claimed in claim 7, wherein a diffraction beam in the holographic reproducing is transmitted to the light detector, the light detector detects a cross-sectional light intensity distribution of the diffraction beam, and the diffraction beam forms a data reading signal, which has a fixed diffraction direction relative to the recording medium.

* * * * *